THERAPEUTIC PULSE GENERATION AND CONTROL CIRCUIT

Filed July 2, 1962 3 Sheets-Sheet 1

INVENTORS
WILLIAM DENIS KENDALL
FRANK A. YARGER
BY White and Haefliger
ATTORNEYS April 7, 1964 W. D. KENDALL ETAL 3,127,895

THERAPEUTIC PULSE GENERATION AND CONTROL CIRCUIT

Filed July 2, 1962 3 Sheets-Sheet 2

INVENTORS
WILLIAM DENIS KENDALL
FRANK A. YARGER
BY White and Haefliger
ATTORNEYS April 7, 1964 W. D. KENDALL ETAL 3,127,895

THERAPEUTIC PULSE GENERATION AND CONTROL CIRCUIT

Filed July 2, 1962 3 Sheets-Sheet 3

INVENTORS
WILLIAM DENIS KENDALL
FRANK A. YARGER
BY
White and Haefliger
ATTORNEYS

United States Patent Office 3,127,895
Patented Apr. 7, 1964

3,127,895
THERAPEUTIC PULSE GENERATION AND CONTROL CIRCUIT

William Denis Kendall and Frank A. Yarger, Los Angeles, Calif., assignors to Dynapower System Corporation, Los Angeles, Calif., a corporation of Delaware Filed July 2, 1962, Ser. No. 206,700
4 Claims. (Cl. 128—422)

This invention relates generally to electrotherapeutic apparatus, and more particularly concerns the generation, control and transmission of electrical pulses of high frequency for application to a patient by means of a treatment head of particular construction, found highly suitable.

Circuits developed in the past to generate and transmit electrical pulses for electrotherapeutic treatment have suffered certain disadvantages. Among these have been undesirable complexity, high manufacturing cost, and inability to control the generated pulses in the manner described herein, such control increasing the utility and therapeutic value of the apparatus.

Accordingly, it is a major object of the invention to provide novel electrotherapeutic apparatus capable of overcoming the disadvantages mentioned above, as well as others found in prior equipment. Broadly considered, the apparatus comprises a power radiating head including coil and capacitor elements electrically interconnected for impedance matching timing with respect to the patient being treated, and novel input circuit means matched to the head as a system. The input circuit means includes oscillator, amplifier and control means for creating and transmitting to the head a sequence of high frequency pulses, and also for controlling the selected amplitude of the pulses and the intervals therebetween in an improved and predetermined manner as related to the operation of the head.

More specifically, the oscillator means provides a high frequency signal, the amplifier means includes a first amplifier means and a power amplifier means connected in series sequence with the oscillator means, and the control means includes pulse interval control means connected with the first amplifier to intermittently interrupt transmission of the high frequency signal to the power amplifier. The control means also includes pulse amplitude control means connected with the power amplifier means to provide amplitude selection of power pulses transmitted to the head, as well as pulse interval control means to provide selection of pulse interval over a predetermined range. The pulse amplitude control means and pulse interval control means desirably incorporate scalers to provide stepwise selection of pulse amplitude and pulse intervals, in a simple and novel manner as will be described. The latter includes an interconnection between the scalers, which are individually operable, to provide resistance to substantial increase in selected pulse amplitude in response to a selected change in pulse interval.

Additional objects and advantages include the provision of feedback from the output of the circuit means to the pulse amplitude control means, for maintaining the selected pulse amplitude substantially constant, and the provision of other novel circuit elements as will appear.

These and other objects and advantages of the invention, as well as the details of an illustrative embodiment, will be more fully understood from the following detailed description of the drawings, in which.

Figure 1:
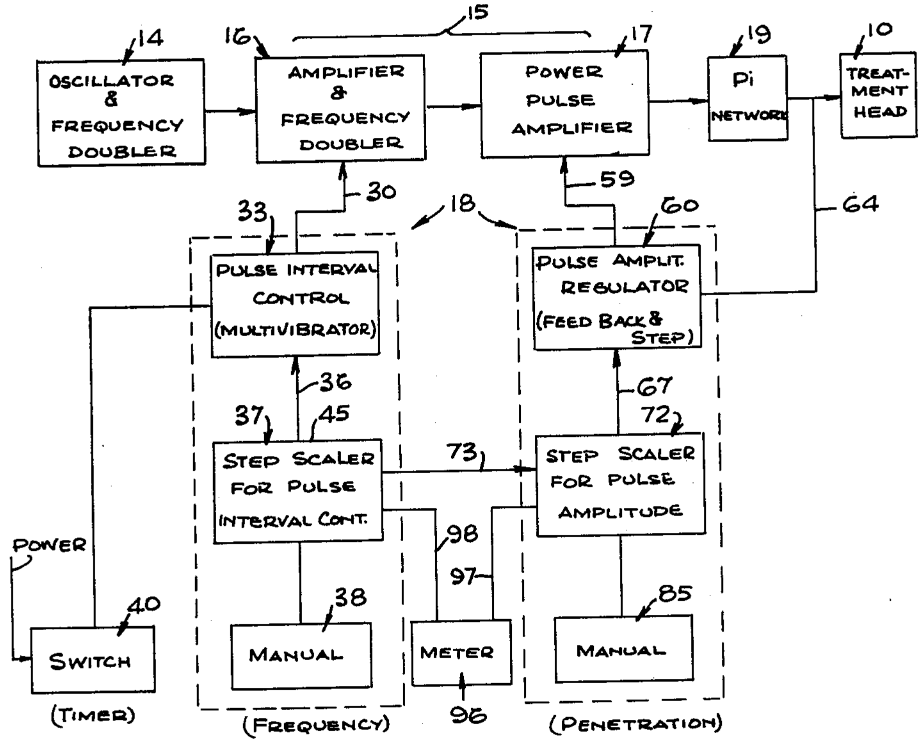
FIG. 1 shows the overall system.
Figure 3:
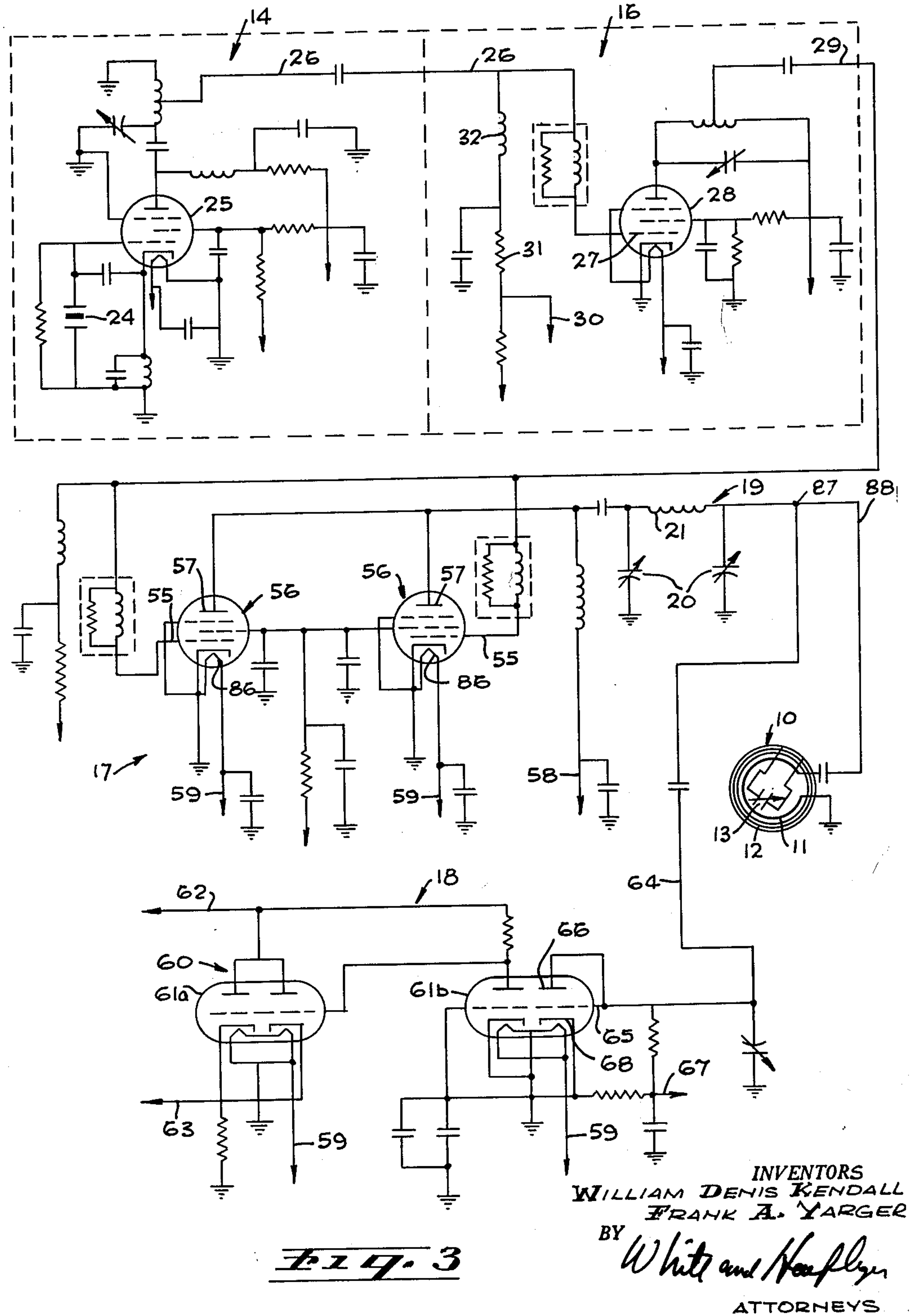
FIG. 3 shows the oscillator and amplifier portions of the circuit, as well as a portion of the control means therefor.

Referring first to FIGS. 1 and 3, the treatment head is indicated at 10 and is shown to comprise primary and secondary coils 11 and 12 respectively, having a typical turns ratio of about 1 to 4. A variable capacitor or condenser is shown at 13 as connected with the secondary coil to provide a tank circuit, the resonant frequency of which is variable for impedance matching purposes as regards the patient who is to be treated with the high frequency pulses. The portion of FIG. 1 to the left of the treatment head comprises the input circuit means for the head and includes an oscillator 14 typically having a frequency doubling function, amplifier means 15 including a first amplifier 16 and a power amplifier 17 connected in series sequence with the oscillator, and control means generally designated at 18 below the amplifier means. These same general elements are indicated in FIG. 3 by the same numerals. The input circuit means also includes an impedance matching pi network 19, the network comprising a low pass filter having variable capacitor 20 and a suitable coil 21.

Figure 2:
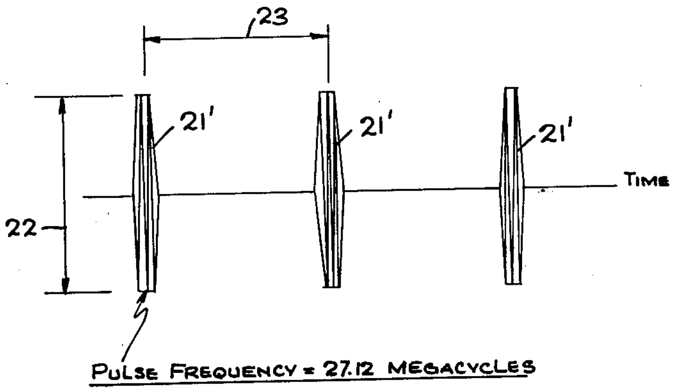
FIG. 2 shows the wave form transmitted to the power head.

Generally speaking, the elements of the circuit are interconnected as described and as to be described, in such manner as to create and transmit to the treatment head a sequence of high frequency pulses, and also to control the selected amplitude of the pulses and the intervals therebetween in predetermined relation. As an illustration of this, reference is made to FIG. 2 showing the sequence of like pulses 21', each of which is made up of a high frequency signal burst having a selected amplitude 22, and having recurrence intervals 23, these having predetermined relationship. Typically, the pulse of the signal frequency will be 27.12 megacycles, and the interval 23 will be variable, preferably in stepwise relation. Also the amplitude equal to one-half the dimension 22 will be variable in stepwise relation as will be described. Thus, the time interval 23 may be varied in four or five steps within the range 1.6 milliseconds to 12.5 milliseconds, in order to increase or decrease the intensity of treatment given the patient.

Referring again to FIG. 3, the oscillator means 14 is shown to include a crystal 24 for establishing a desired high frequency oscillation say 6.780 megacycles. This frequency is applied to the tube 25 and doubled in the oscillator to the value 13.56 megacycles for transmission at 26 to the amplifier doubler 16, and in particular to the grid 27 of the tube 28. One function of the amplifier-doubler 16 is to double the frequency to the value 27.12 megacycles which is transmitted at 29 to the power amplifier 17. An additional function is to transmit the high frequency in pulses, as established by the switching pulse input at 30 which is coupled to the lead 26 through the resistor 31 and coil 32.

Figure 4:
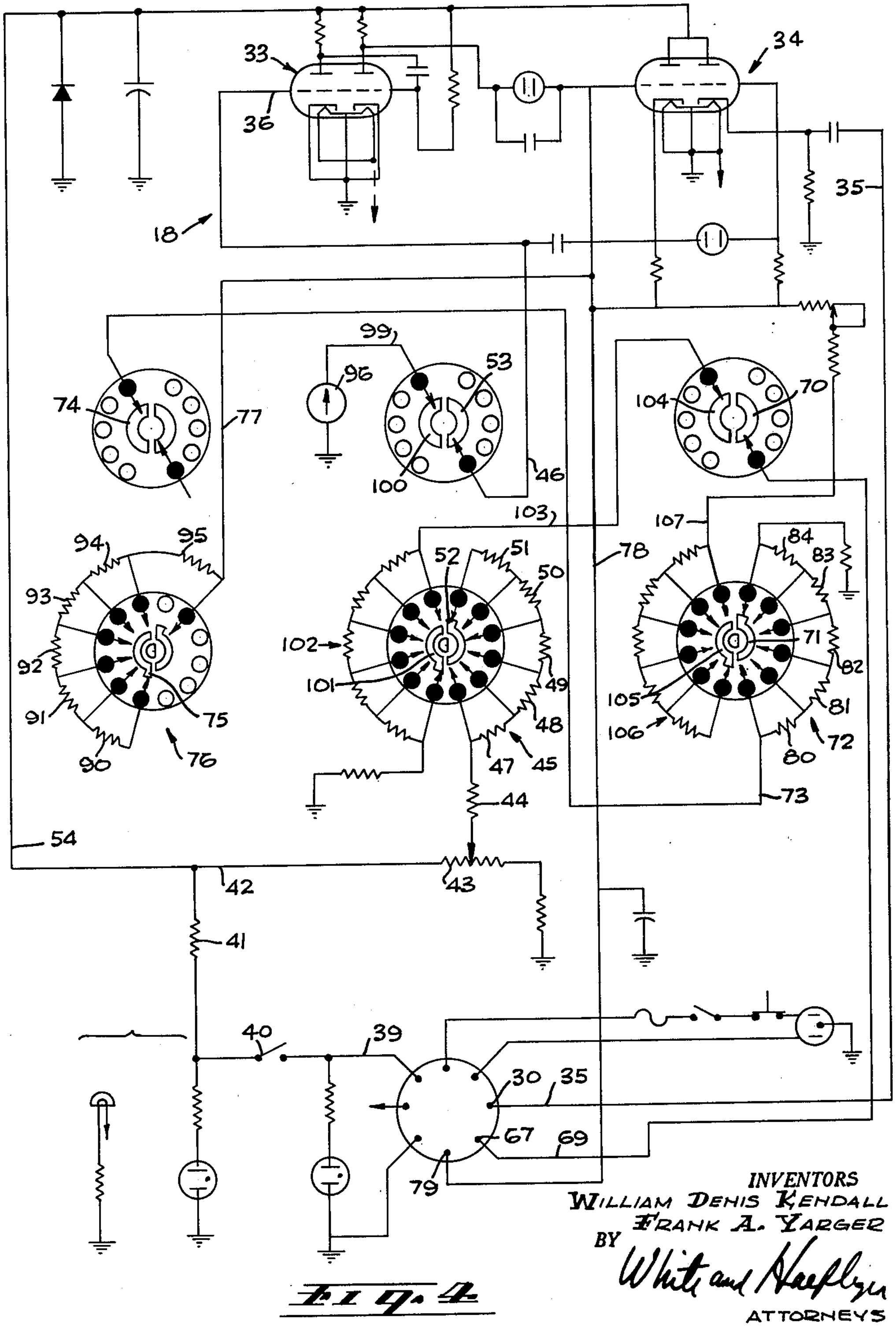
FIG. 4 shows the remainder of the circuit control means.

The switching pulse input is obtained from the output of the multivibrator 33 shown in FIG. 4 which is coupled to the cathode follower stage 34 shown in the same figure. The output from the cathode follower is obtained at 35 and transmitted at 30, as previously described. The multivibrator 33 has a grid input shown at 36, the voltage of which is variable and preferably stepwise variable to provide selection of pulse interval over the previously described predetermined range. FIG. 1 shows the step control 37 for the multivibrator 33 as having a manual control 38 in order to provide the selection of pulse interval.

A highly desirable step control for the multivibrator is illustrated in FIG. 4 to comprise a circuit which includes the B+ voltage lead 39, timer switch 40, resistor 41, lead 42, calibration potentiometer 43, resistor 44, step resistance selector 45 providing voltage scaler or divider means, and lead 46 connected to the grid input 36. As shown in FIG. 4, the device 45 includes a series of resistances 47 through 51 which are connected in series and are tapped as illustrated for selective connection to the rotatable terminal 52. The latter is connected through the device 45 with the terminal 53 on the back side, the latter being connected to the lead 46. Accordingly, as the terminal 52 is rotated, different of the resistors are connected in series to provide a selective voltage application to the grid of the multivibrator 33 for pulse interval control. In this connection, the plates of the multivibrator are suitably supplied with voltage by means of the lead 54.

Turning back to FIGS. 1 and 3, the output from the amplifier-doubler 16 is transmitted at 29 to the grids 55 of the power amplifier tubes 56, for pulse power amplification. In this connection, the plates 57 of the tubes 56 are suitably supplied with high voltage, for example 3000 volts D.C. from the point 58. FIG. 1 shows the amplifier 17 as having an input at 59 from what may be described as a pulse amplitude control or regulator 60. The input points 59 are also shown in FIG. 3 at the amplifier 17 and also at the pulse amplitude controller, generally indicated at 60. The plates and cathodes of the controller tubes 61 are suitably supplied with appropriate voltage at the points 62 and 63 respectively. The controller has feedback input designated at 64, applied to the grid 65 and plate 66 of one tube 61 so as to operate as a diode, and it also has input at 67 for application to the cathode 68 of the diode portion of that one tube.

The point 67 is also shown in FIG. 4 as being connected with the series circuit that includes the leads 69 of rotary terminal 70, rotary terminal 71 of the scaler or voltage divider device 72, lead 73, rotary terminals 74 and 75 of the auxiliary scaler or voltage divider device 76, lead 77, lead 78 and points 79 suitably supplied with negative D.C. voltage. Device 72 is like device 45 in that it is provided with a series of resistors 80 through 84 connected in series and provided with intermediate taps which are selectively connectible with the rotary terminal 71 upon manual turning thereof as by the control shown at 85 in FIG. 1. Accordingly, a selected voltage is applied to the input point 67 of the pulse amplitude regulator 60 and therefore the outputs 59 of the regulator are stepwise variable to control the voltage applied to the screen elements 86 of the power amplifier tubes 56, given the desired step control of pulse amplitude.

An additional function of the pulse amplitude regulator is to regulate the selected amplitude of the pulses 21 transmitted to the radiating head 10. This is accomplished by means of the feedback coupling shown at 64 and which is taken from the point 87 in the lead 88 connecting the pi network 19 with the head 10. The functioning is such that if the amplitude of the selected pulse being transmitted to the head increases, the regulator output voltage at points 59 drops to drop the voltage applied to the screen grids 86 of the power amplifier tubes 56, thereby suitably dropping the power pulse amplitudes.

Turning now to FIGS. 1 and 4, the connection as shown at 73 functions to interconnect the step controls or scalers 72 and 76 as previously described. The scaler 76 is operated simultaneously with the scaler 45, as by mounting on a common shaft, turnable by the manual control 38. Accordingly, an adjustment in the step controller scaler 45 to change the pulse interval simultaneously changes the pulse amplitude by virtue of a change in the resistance of the step control circuit for the pulse amplitude regulator. The purpose of this cross over connection is to provide resistance to substantial increase in the selected pulse amplitude in response to a selected change in the pulse interval. In other words, in the absence of such cross over interconnection 73 with its associated scaler 76, the pulse amplitude would change to an undesirable extent in response to a selected change in the pulse interval, so that this problem is solved by means of the described cross over control. The scaler device 76 is similar to those previously described in that it includes a series of resistors 90 through 95 which are tapped at intermediate points for selective connection to the rotary terminal 75, placing a desired number of the resistors in series in the circuit.

Finally, reference to FIG. 1 shows a meter 96 connected at 97 and 98 to both the step control 37 comprised of the devices 45 and 76, and also to the step control devices 72. The purpose for such dual connection is to cause the meter to sense the changes in both of these controls. A desirable connection serving this purpose is shown in FIG. 4 with the meter 96 connected with the scaler 45 as by means of a series circuit including the lead 99, rotary terminals 100 and 101, scaler or voltage divider 102, lead 103, rotary terminals 104 and 105 of the scaler or voltage divider 106, and voltage supply lead 107. In this regard, the scaler 102 is made responsive to adjustment in the scaler 45 by mounting on a common shaft, whereas the scaler 106 is made responsive to adjustment of the scaler 72. Accordingly, adjustment of either of the scalers 45 and 72 will effect adjustment of one or the other of scalers 102 and 103 thereby to effect the reading of the meter 96, so that the pulse interval and pulse amplitude controls are working.

We claim:

1. Electrotherapeutic apparatus, comprising a power radiating head including a single turn primary coil, a multiple turn secondary coil and a condenser connected with the secondary coil to provide a tank circuit, and input circuit means for the head including an oscillator generating an oscillating electrical signal which is a submultiple of approximately the frequency 27.12 megacycles, first means to amplify and increase said signal frequency to an operation frequency of about 27.12 megacycles, vibrator means coupled to said first means to interrupt the transmission of said operating frequency signal at predetermined intervals thereby to create a sequence of high frequency pulses transmitted by said first means, primary control means including a first step switch coupled to said vibrator means to control the operation thereof so as to provide stepwise selection of the recurrence interval of successive pulses, a power amplifier coupled to receive and amplify the pulses transmitted by said first means for transmission to said primary coil of the head, and secondary control means including a second step switch coupled to said power amplifier to control the operation thereof so as to provide stepwise selection of the transmitted pulse amplitude.

2. The combination of claim 1 in which said primary control means has a first electrically energizable and voltage dividing resistance network electrically connected in regulating relation with said vibrator means through the first step switch thereby to control said selection of the recurrence interval of successive pulses in response to stepping of the first switch relative to the first network, said secondary control means having a second electrically energizable and voltage dividing resistance network electrically connected in regulating relation with said power amplifier through the second step switch thereby to control said selection of the transmitted pulse amplitude in response to stepping of the second step switch relative to said second network, and including auxiliary control means having an auxiliary step switch and an auxiliary electrically energizable and voltage dividing resistance network electrically connected with said first network through said auxiliary step switch, the primary and auxiliary control means being mechanically interconnected to cause the primary and auxiliary step switches to step together relative to said primary and auxiliary networks thereby to change the resistance connected in series with the power amplifier through the second step switch when only the first step switch is stepped relative to said first network, said resistance change acting to resist any increase in pulse amplitude resulting from said stepping of the first step switch relative to said first network.

3. The combination of claim 2 including feedback coupling from primary coil input to the secondary control means to maintain the selected pulse amplitude substantially constant.

4. The combination of claim 2 including a current meter, fourth and fifth stepping switches, and fourth and fifth electrically energizable and voltage dividing resistance networks connected in series with said meter through said fourth and fifth switches respectively, thereby to control the meter reading in response to stepping of either of said fourth and fifth stepping switches relative to said fourth and fifth resistance networks, said fourth and first stepping switches being mechanically connected to step together, and said fifth and second step switches being mechanically connected to step together whereby the meter reading changes in response to stepping of the first and second stepping switches without affecting the first and second network electrical characteristics.

References Cited in the file of this patent

UNITED STATES PATENTS

| | | |
|---|---|---|
| 1,338,269 | Wappler | Apr. 27, 1920 |
| 1,752,642 | De Beaumont | Apr. 1, 1930 |
| 2,276,996 | Milinowski | Mar. 17, 1942 |
| 2,295,585 | Lindquist | Sept. 15, 1942 |
| 2,590,216 | Schuhfried | Mar. 25, 1952 |
| 2,660,165 | Miller | Nov. 24, 1953 |
| 2,713,120 | Mostofsky | July 12, 1955 |
| 2,836,672 | Paust | June 10, 1958 |